Jan. 12, 1971   A. S. IRWIN   3,554,619
BEARING SUPPORT
Filed Nov. 22, 1968
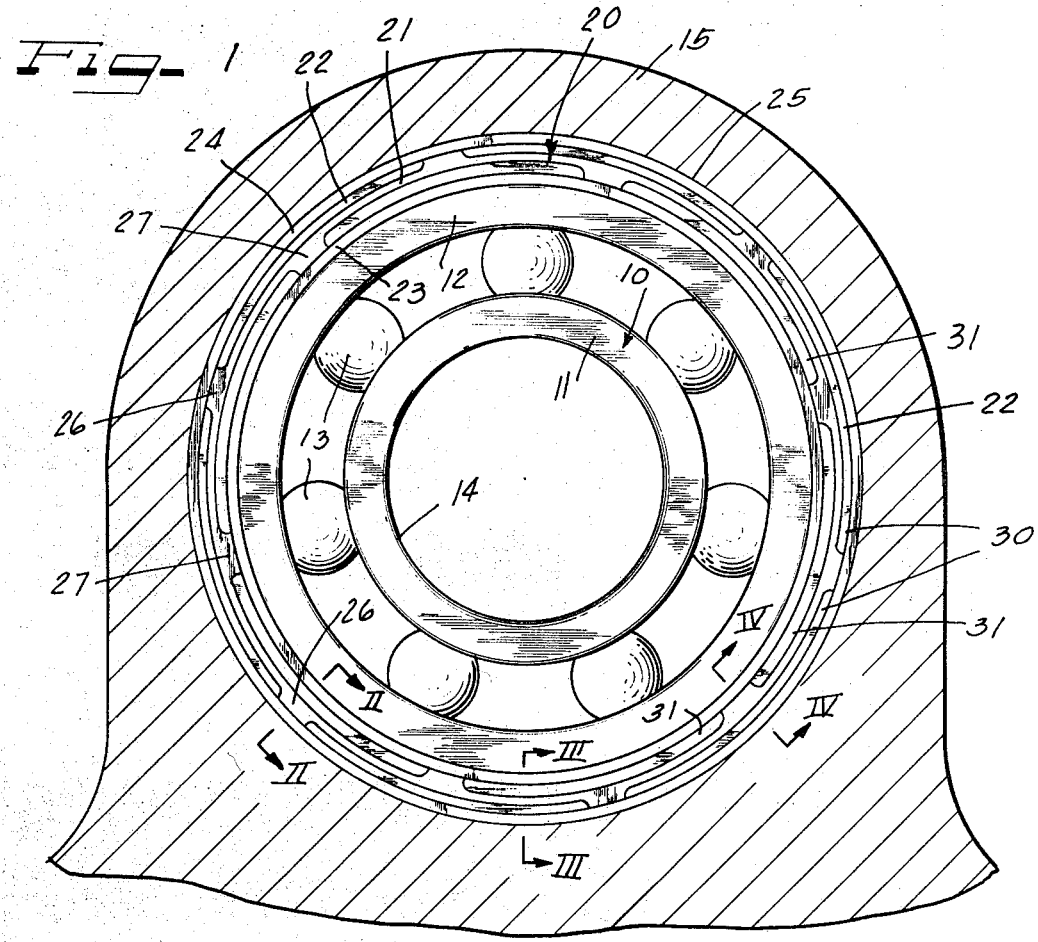
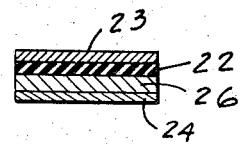 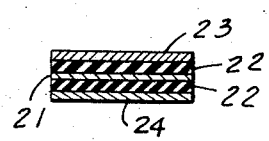 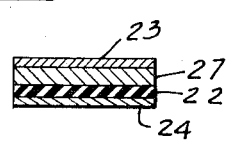
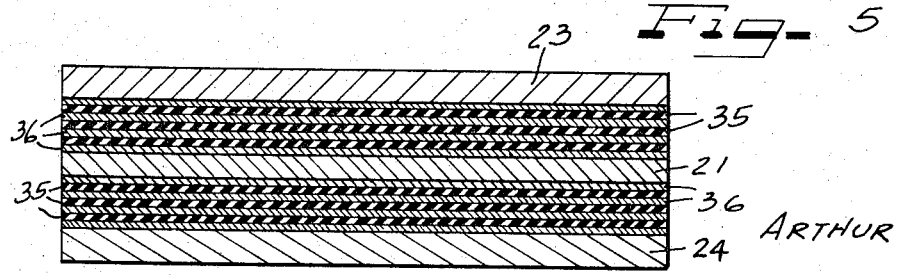
INVENTOR.
ARTHUR S. IRWIN
BY  Hill, Sherman, Meroni, Gross & Simpson  ATTORNEYS

United States Patent Office 3,554,619
Patented Jan. 12, 1971

3,554,619
BEARING SUPPORT
Arthur S. Irwin, Jamestown, N.Y., assignor to TRW Inc., Cleveland, Ohio, a corporation of Ohio
Filed Nov. 22, 1968, Ser. No. 778,202
Int. Cl. F16c 35/00
U.S. Cl. 308—184                                    2 Claims

ABSTRACT OF THE DISCLOSURE

A cylindrical bearing support for encirclingly supporting an antifriction bearing assembly having three spaced concentric metallic cylinders, the center one having a plurality of alternately radially inwardly directed and radially outwardly directed protuberances contacting respectively the inner and outer cylinders, said protuberances circumferentially spaced from each other. The bearing support then acts as a spring storing energy caused by radial deflection of the inner ring. The spaces between the cylinders are filled with elastomer or with alternating layers of extremely thin elastomer and nonelastomeric substances.

BACKGROUND OF THE INVENTION

Field of the invention

This invention relates to bearing housings and particularly to an elastomeric bearing housing with a spring return.

Prior art

Many rotating members such as shafts are supported at numerous points along their length by bearing assemblies mounted in pillow blocks. If a shaft is supported by, for example, three such bearing assemblies, the slightest out-of-line causes two bearing assemblies to load the third. This out-of-line may result from relative displacement of the housings, such as from a warped mounting frame, or may result from relative displacement of the shaft seats, such as from a bent shaft. In the first case, the load created is fixed in position relative to the outer ring of the bearing and is of a fixed or nonvibrating nature. In the second case the load created moves with the shaft creating, in the outer ring of the bearing, a moving load. Any portion of the outer ring is therefore subjected to repeated loading, tension to compression.

Further internal temperature differentials are created in all bearing assemblies by (a) friction heat, preferably distributed equally to different parts of the bearing; and (b) external heat, seldom applied equally to all parts of the bearing. Internal preload problems are created by these temperature differentials when the outer diameter of the bearing assembly is restricted from expansion.

Some prior art assemblies have attempted to combat these problems by the provision of spring mountings. One such mounting comprises three concentric cylinders, the inner cylinder having radially inwardly and radially outwardly projecting nibs contacting the inner and outer cylinders. The bearing assembly is mounted within the inner cylinder. Because of the springiness of such a mounting, extreme vibration can build up in such an assembly especially when the assembly is subjected to moving loads such as would be caused by a bent shaft.

SUMMARY OF THE INVENTION

The present invention overcomes the disadvantages inherent in the aforementioned concentric cylinder spring mountings by providing elastomer in the spaces between the middle cylinder and the inner and outer cylinders circumferentially between the nibs.

The provision of elastomer adds stability to the circumferential cylinder spring, allowing the bearing to serve its original purpose of supporting a member in a definite position while retaining the advantages of such a spring. Further, provision of the elastomer allows tailoring the spring rate of the concentric cylinder spring. The hysteresis of the elastomer provides a built-in dampening to inhibit the otherwise inherent vibratory spring rate of the concentric cylinder spring.

In those applications where it is desired to modify the load carrying and flex characteristics of the mounting assembly, alternating thin layers of elastomer and nonelastomer may be used. Such alternating layer bearings and the advantages inherent therein are taught, for example, in the William L. Hinks Pat. No. 2,900,182, granted Aug. 18, 1959, from an application filed Apr. 27, 1955. Bonding of the various layers together provides a mounting which is capable of not only adjusting to radial loads and vibration, but also of accepting thrust loads on the bearing.

It is therefore an object of this invention to provide a bearing mounting assembly accommodating radial movement of the bearing assembly.

It is another object of this invention to provide a bearing assembly spring mount accommodating radial movement of the bearing assembly and having a low spring rate.

It is yet another and more specific object of this invention to provide a bearing assembly spring mount having concentric cylindrical metal members, the center member having radially inwardly and radially outwardly directed nibs to provide a concentric radial spring, the spaces between the nibs being circumferentially filled with elastomer to dampen the spring rate of the cylindrical mount.

It is still another and specific object of this invention to provide a bearing assembly mount capable of accommodating radial loads and vibrations which has three concentric cylinders, the central cylinder having radially inwardly and radially outwardly directing nibs to provide a radial spring, the space between the nibs being filled with alternate layers of thin elastomer and nonelastomer to provide stability and dampening to the cylindrical mount.

BRIEF DESCRIPTION OF THE DRAWINGS

FIG. 1 is a plan view partially in section illustrating a bearing assembly and mount incorporating the radial spring assembly of this invention.

FIG. 2 is a cross section of the spring mount of FIG. 1 taken along the lines IV—IV.

FIG. 3 is a cross section of the spring mount of FIG. 1 taken along the lines III—III.

FIG. 4 is a cross-sectional view of the spring mount of FIG. 1 taken along the lines IV—IV.

FIG. 5 is a cross-sectional view similar to FIG. 3 illustrating another embodiment.

DESCRIPTION OF THE PREFERRED EMBODIMENTS

As illustrated in FIG. 1, antifriction bearing assemblies 10 generally comprise inner and outer raceways 11 and 12 which are concentric and which confine and provide tracks for antifriction rolling elements 13 such as ball bearings. In such assemblies, a central bore 14 in the inner raceway 11 is designed to receive a rotating element such as a shaft while the outer raceway 12 is held against rotation and mounted in a support structure such as a pillow block 15. In this manner, the shaft or other rotating element is supported laterally while free to rotate within the assembly.

The bearing assembly can be directly mounted in the pillow block, however for the reasons above discussed, it is desirable to mount the bearing assembly in such a manner that it may move radially within the pillow block when subjected to radial forces. It is also necessary to construct a mounting which will return the assembly to its static position after the radial force has been accommodated. Metallic spring mountings have been devised for this purpose. However, such spring mountings, in order to allow sufficient radial movement, generally have high spring rates which create a return movement with a pendulum character which carries the bearing assembly past its static position a large number of times. It can be seen that in the case of repeated loading, such as from an off-center or bent shaft, the spring rate can build up sufficiently to damage the assembly.

Elastomeric mountings such as rubber have also been envisioned. However, such mountings, due to the low spring rate of rubber, do not return the bearing assembly to its static position in a sufficiently short period of time.

The bearing mount or support 20 of this invention comprises a metal spring element 21 and elastomer elements or pads 22. FIG. 1 illustrates the mounting 20 as comprising inner and outer cylindrical sleeves 23 and 24. The sleeves 23 and 24 are concentric and the sleeve 23 encircles the outer race 12 of the bearing assembly 10. The outer sleeve 24 is received in the mounting bore 25 of the pillow block 15.

The metallic spring element 21 is positioned between the inner and outer sleeves 23 and 24 and is concentric therewith. The spring element 21 is positioned equidistant between the inner and outer sleeves and has radially outwardly projecting nibs 26 and radially inwardly projecting nibs 27. The outwardly projecting nibs 26 contact the inner diameter of the outer sleeve 24 and the inwardly projecting nibs 27 contact the outer diameter of the inner sleeve 23. As illustrated, the nibs 26 and 27 are equidistantly circumferentially spaced and alternate between inwardly directed nibs and outwardly directed nibs.

The spring member 21 is sufficiently thin in a radial direction to act as a radial spring flexing the metal between the protuberances or nibs. The spring member 21 acts to store radial energy to return the bearing assembly to its static position after radial deflection.

Although the bearing mount or support is illustrated as having three concentric cylindrical members, it is to be understood that with proper machining and assembly techniques the inner 23 and outer 24 sleeves can be eliminated. In such an assembly the outer diameter of the outer race 12 functions as the inner sleeve 23 and the wall of the bore 25 of the pillow block 15 functions as the outer cylinder. FIG. 1 illustrates, though, the preferred embodiment which has obvious advantages of mass producibility and replaceability over the alternate construction.

The annular spaces 30 between the nibs 26 and 27 radially between the spring member 21 and the outer shell 24 and the annular spaces 31 between the nibs 27 radially between the spring member 21 and the inner shell 23 are filled with elastomer preferably bonded to the respective surfaces of the shells 23 and 24 and spring member 21. The elastomer 22 may be of natural rubber or of any of the artificial elastomers, the desirability of each being dependent upon the specific application in which the bearing mount is to be used. The elastomer 22 due to its natural hysteresis acts as a dampening factor to prevent the buildup of vibratory oscillations in the mount. Radial deflection of the bearing is restricted by both the spring member 21 and by compression of the elastomer pads 22. The spring members store energy necessary to return the bearing assembly to its static position, while the elastomer members tend to dissipate energy by their dampening ability.

In those applications where it is desired that the bearing retain relatively small axial loads, the bonding of the elastomer pads 22 to the spring member 21 and inner and outer shells 23 and 24 may be sufficient. However, in higher thrust load applications it may also be desirable to permamently attach the spring member 21 to the inner and outer shells in the nib areas 26 and 27. In high thrust applications the edges of the nibs may abut thrust carrying surfaces thereby allowing the mount to support axial thrust load without having an integral structure. Interference devices such as projections and recesses may be used to prevent rotation of the outer race 12 with respect to the inner shell 23 and of the outer shell 24 with respect to the pillow block 15.

In those applications where it is desired to use a specific type of elastomer or where no suitable elastomer will provide sufficient hysteresis the elastomer pads 22 may be composed of alternate layers of thin elastomer and nonelastomer strips. Such an embodiment is illustrated in FIG. 5 in an enlarged cross section similar to FIG. 3. In this embodiment relatively thin layers of elastomer 35 alternate with relatively thin layers of nonelastomer 36 such as metal, plastic, paper or the like. Such a construction may be in accordance with the teachings of the aforementioned Hinks Pat. No. 2,900,182 which teaches that stacks of such materials may be relatively incompressible. Varying the thickness of the layers changes the hysteresis of the stack as a whole as well as varying the ability of the stack to withstand compression.

According to the teachings of the Hinks patent the alternating layers are bonded together. If the stack is further also bonded to the inner and outer shells 23 and 24 and the spring member 21, this will result in an assembly which is able to withstand axial thrust loads as well as a radial spring bearing mount.

It can therefore be seen that proper selection of the material and dimensions of the spring member 21 can provide the mount with the desired flexibility in accommodating radial loads while proper selection of the material of the elastomer pads or construction thereof according to the embodiment illustrated in FIG. 5 allows provision of a dampening factor in the spring mount which will allow the mount to return the bearing assembly to its static position in a sufficiently short period of time, while at the same time preventing oscillatory spring buildup due to the spring rate of the member 21.

I claim as my invention:

1. An antifraction bearing assembly comprising: inner and outer radially spaced concentric race rings, antifriction bearing elements between said rings, a first cylindrical member surrounding said outer race ring circumferentially in contact therewith, a second cylindrical member concentric with the said first cylindrical member and radially spaced therefrom, a spring member positioned radially between said cylindrical members, said spring member being cylindrical and concentric with said cylinders, said spring member having radially inner and radially outer faces, a plurality of radially thickened axially extending relatively circumferentially narrow protuberances on said inner and outer faces projecting radially therefrom, the protuberances on the said radially inner face circumferentially offset from the protuberances on the radially outer face, protuberances on each of said faces spaced from one another circumferentially, the said protuberances projecting from the said inner face contacting the said first cylindrical member in a manner whereby spaces are formed between adjacent protuberances and the said inner face and said first cylindrical member, protuberances projecting from the said outer face contacting the said second cylindrical member whereby second spaces are created between adjacent protuberances and the said outer face and the said second cylindrical member, the said spaces and said second space radially overlapping one another separated by the said spring member, the said spring member being constructed of a material radially resilient between the said protuberances thereby providing a spring suspension for the said raceways with respect to the said second cylindrical member, and the said spaces and second spaces substantially filled with vibration dampening elastomer material bonded to said first and second cylindrical members and to the said spring member.

2. The assembly of claim 1 wherein the said spaces are filled with alternate layers of bonded-together relatively thin elastomer and nonelastomer with elastomer layers contacting respectively the first cylindrical member and the said inner faces and bonded thereto and the said second cylindrical member and the said outer face and bonded thereto.

References Cited

UNITED STATES PATENTS

| 3,053,590 | 9/1962 | Dison, Jr. | 308—184 |
| 3,228,673 | 1/1966 | Hinks | 308—26 |
| 3,348,289 | 10/1967 | Marsh | 308—184 |

FOREIGN PATENTS

| 824,185 | 11/1959 | Great Britain | 308—184 |
| 795,413 | 1/1936 | France | 308—184 |

FRED C. MATTERN, Jr., Primary Examiner

F. SUSKO, Assistant Examiner